UNITED STATES PATENT OFFICE.

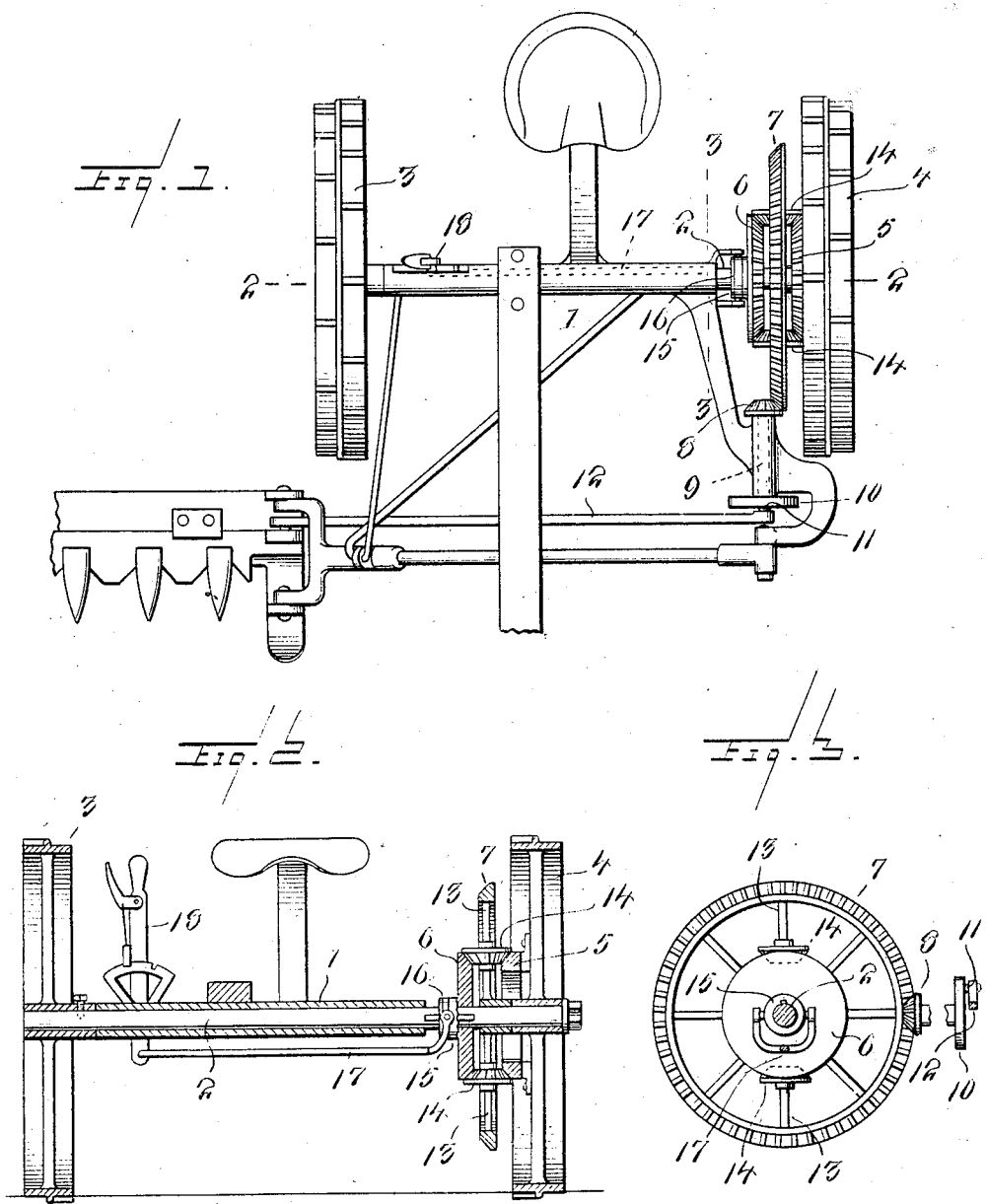

CHARLES S. LANGTON, OF OLNEY, ILLINOIS.

MOWING-MACHINE.

1,053,834.   Specification of Letters Patent.   Patented Feb. 18, 1913.

Application filed January 7, 1911. Serial No. 601,301.

*To all whom it may concern:*

Be it known that I, CHARLES S. LANGTON, a citizen of the United States of America, residing at Olney, in the county of Richland and State of Illinois, have invented new and useful Improvements in Mowing-Machines, of which the following is a specification.

This invention relates to mowing machines, and it has for its object to produce a simple and efficient device for transmitting motion from the traction wheels to the cutting mechanism in such a manner that the power shall be equalized, thus insuring perfect transmission when the traction wheel at one side of the machine moves ahead of or at greater speed than the traction wheel at the opposite side.

A further object of the invention is to produce a simple and efficient transmission means whereby the pawl and ratchet clutches usually employed, and which have been found deficient in that the transmission of power is not equally distributed at all times, may be dispensed with.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a top plan view showing as much of a mowing machine of conventional construction as is necessary to illustrate the invention. Fig. 2 is a sectional view taken on the line 2—2 in Fig. 1. Fig. 3 is a sectional view taken on the line 3—3 in Fig. 1.

Corresponding parts in the several figures are denoted by like characters of reference.

The frame 1 of the improved mowing machine is provided with bearings for the axle 2 carrying the traction wheels one of which, 3, is rigid with the axle, while the other traction wheel 4 is mounted for rotation thereon. The traction wheel 4 carries a bevel gear 5 which is fixed thereon and which faces a corresponding bevel gear 6, the latter being slidably mounted upon the axle with which it is connected for rotation by means of a key or spline or in any well known and approved manner.

Mounted for rotation upon the axle intermediate the bevel gears 5 and 6 is the master wheel 7 of a compensating gear, said master wheel being itself in the nature of a bevel gear, that is to say, its rim is provided with bevel teeth to mesh with a bevel pinion 8 upon one end of the transmission shaft 9, the other end of which carries a disk 10 having a wrist or crank 11 connected with one end of a pitman 12, whereby reciprocatory motion is transmitted to the knife of the cutting apparatus.

The master wheel 7 includes diametrically opposite spokes 13 upon which oppositely disposed bevel pinions 14 are mounted for rotation, said bevel pinions being in mesh with the bevel gears 5 and 6 upon the traction wheel 4 and the axle 2, respectively.

The hub 15 of the bevel gear 6 has an annular groove 16 which is engaged by the bifurcated end of a shipping rod 17, the opposite end of which is hingedly connected with a hand lever 18 fulcrumed upon the frame of the machine and by means of which the bevel gear 6 may be moved longitudinally of the axle to place it into or out of engagement with the bevel pinions 14 of the compensating gear. The said shipping rod 17 is disposed in a horizontal plane with the axle of the mower. Stop means of any well known description may be provided to retain the hand lever and the gear wheel 6 in adjusted position.

From the foregoing description, taken in connection with the accompanying drawing, the operation and advantages of this invention will be readily understood. By making the master wheel is sufficiently large with reference to the pinion 8 upon the transmission shaft, the latter may be driven at the requisite speed without the use of additional gearing. When the traction wheels travel at equal speed, the motion will obviously be transmitted through the bevel gears 5 and 6 to the master wheel 8 through the pinions 14 which remain stationary with respect to the wheel 7 as long as the traction wheels move at equal speed. When the speed of the traction wheels for any reason becomes irregular or uneven, the compensating gear including the gear wheels 5 and 6, the pinions 14 and the master wheel 7 will serve to equalize the movement as it is being transmitted through the shaft 10 to the cutting apparatus. To place the machine out of gear the gear wheel 7 is simply disengaged from the pinions 14 which latter will then be rotated idly by the action of the gear wheel 5.

Having thus described the invention, what is claimed as new, is:—

A mowing machine comprising a frame, an axle journaled therein, a traction wheel fixed to the axle, a traction wheel journaled upon the axle, a beveled gear wheel fixed directly to the side of the journaled traction wheel, a beveled gear wheel slidably mounted upon the axle, and arranged to rotate in unison with the same, a compensating gear mechanism mounted upon the axle between the said gear wheels, a second shaft journaled in the frame and operatively connected with said compensating gear mechanism and adapted to be operatively connected with the cutting apparatus of the mower.

In testimony whereof I affix my signature in presence of two witnesses.

CHARLES S. LANGTON.

Witnesses:
 JOHN WINTER,
 ROY YOST.